(12) United States Patent
Yasutome

(10) Patent No.: US 10,764,322 B2
(45) Date of Patent: Sep. 1, 2020

(54) INFORMATION PROCESSING DEVICE, INFORMATION PROCESSING METHOD, AND COMPUTER-READABLE RECORDING MEDIUM

(71) Applicant: NEC Corporation, Minato-ku, Tokyo (JP)

(72) Inventor: Yoshio Yasutome, Tokyo (JP)

(73) Assignee: NEC CORPORATION, Tokyo (JP)

( * ) Notice: Subject to any disclaimer, the term of this patent is extended or adjusted under 35 U.S.C. 154(b) by 359 days.

(21) Appl. No.: 15/915,262

(22) Filed: Mar. 8, 2018

(65) Prior Publication Data
US 2018/0278644 A1 Sep. 27, 2018

(30) Foreign Application Priority Data
Mar. 27, 2017 (JP) .................................. 2017-060588

(51) Int. Cl.
*H04L 29/06* (2006.01)
*G06N 5/04* (2006.01)
*G06F 3/0484* (2013.01)

(52) U.S. Cl.
CPC ........... *H04L 63/1441* (2013.01); *G06N 5/04* (2013.01); *H04L 63/1433* (2013.01); *G06F 3/04847* (2013.01)

(58) Field of Classification Search
CPC ... H04L 63/1441; H04L 63/1433; G06N 5/04; G06F 21/55; G06F 21/57; G06Q 10/04
See application file for complete search history.

(56) References Cited

U.S. PATENT DOCUMENTS

| 6,205,434 B1* | 3/2001 | Ryan .................. G06Q 40/02 705/36 R |
| 2003/0160818 A1* | 8/2003 | Tschiegg ............... G06Q 40/08 715/743 |

(Continued)

FOREIGN PATENT DOCUMENTS

| JP | 5304243 B2 | 10/2013 |
| WO | 2015/114791 A1 | 8/2015 |

OTHER PUBLICATIONS

Extended Search Report for Singapore Application No. 10201802193Y dated Aug. 20, 2018.

*Primary Examiner* — Tongoc Tran

(57) ABSTRACT

An operation information specification unit 82, with use of terminal-specific countermeasure information indicating an applicable countermeasure for each terminal against a security risk and definition information defining a correspondence relationship between a type of operation information of the terminal and a countermeasure against the security risk, specifies a type of operation information corresponding to the countermeasure applicable to the terminal. An operation information acquisition unit 83 acquires operation information of the type specified by the operation information specification unit 82, from among operation information of the terminal. A prediction unit 85, based on the operation information acquired by the operation information acquisition unit 83, predicts the number of remaining terminals at a future time, and predicting the number of remaining terminals at the future time in expectation of the number of countermeasure suspension days that is the number of delay days from a scheduled date of countermeasure application in the past to an actual date of countermeasure application in the past.

8 Claims, 16 Drawing Sheets

(56) References Cited

U.S. PATENT DOCUMENTS

| | | | |
|---|---|---|---|
| 2005/0193250 A1 | 9/2005 | Takeuchi et al. | |
| 2007/0266434 A1* | 11/2007 | Reifer | G06F 21/14 |
| | | | 726/22 |
| 2007/0271612 A1* | 11/2007 | Fang | G06F 21/567 |
| | | | 726/22 |
| 2008/0313738 A1* | 12/2008 | Enderby | H04L 63/1416 |
| | | | 726/24 |
| 2009/0241188 A1* | 9/2009 | Komura | H04L 63/1416 |
| | | | 726/22 |
| 2010/0046378 A1* | 2/2010 | Knapp | H04L 41/0631 |
| | | | 370/242 |
| 2010/0132040 A1* | 5/2010 | Bhagwat | H04L 63/1416 |
| | | | 726/23 |
| 2010/0154059 A1* | 6/2010 | McNamee | H04L 63/1408 |
| | | | 726/23 |
| 2010/0205651 A1* | 8/2010 | Yanoo | G06F 21/62 |
| | | | 726/1 |
| 2012/0151565 A1* | 6/2012 | Fiterman | H04L 63/107 |
| | | | 726/7 |
| 2013/0212681 A1 | 8/2013 | Endoh et al. | |

* cited by examiner

FIG. 2

| TERMINAL IDENTIFICATION INFORMATION | INFORMATION TYPE | TERMINAL DATA |
|---|---|---|
| TERMINAL A | OS TYPE | X X X |
| | OS VERSION | 6.1 |
| | INSTALLED APPLICATION | A SOFTWARE, B SOFTWARE ... |
| TERMINAL B | : | : |
| : | : | : |

FIG. 3

| TERMINAL IDENTIFICATION INFORMATION | APPLICABLE COUNTERMEASURE |
|---|---|
| TERMINAL A | COUNTERMEASURE(1), COUNTERMEASURE(3) |
| TERMINAL B | COUNTERMEASURE(2) |
| TERMINAL C | COUNTERMEASURE(3) |
| ⋮ | ⋮ |

FIG. 4

COUNTERMEASURE IMPLEMENTATION HISTORY OF TERMINAL A

| SECURITY RISK | ASSESSMENT START DATE | COUNTERMEASURE SCHEDULED DATE | COUNTERMEASURE IMPLEMENTATION RESULT | NUMBER OF COUNTERMEASURE SUSPENSION DAYS |
|---|---|---|---|---|
| VULNERABILITY A | 2016/8/3 | 2016/8/3 | 2016/8/3 | 0 |
| VULNERABILITY B | 2016/9/20 | 2016/9/20 | 2016/9/21 | 1 |
| VULNERABILITY C | 2016/10/13 | 2016/10/20 | 2016/10/27 | 7 |
| ‥ | ‥ | ‥ | ‥ | ‥ |

FIG. 5

| TERMINAL IDENTIFICATION INFORMATION | CLASSIFICATION 1 | CLASSIFICATION 2 |
|---|---|---|
| TERMINAL A | SERVER | — |
| TERMINAL B | SERVER | — |
| TERMINAL C | SERVER | — |
| ⋮ | ⋮ | ⋮ |
| TERMINAL a | CLIENT | PRIORITY: HIGH |
| TERMINAL b | CLIENT | PRIORITY: MEDIUM |
| TERMINAL c | CLIENT | PRIORITY: LOW |
| ⋮ | ⋮ | ⋮ |

FIG. 6

VULNERABILITY DISPLAY SCREEN

VULNERABILITY A OVERVIEW

| | | WITH RISK | ▼AFTER ONE WEEK | | REMAINING RISK AFTER COUNTER-MEASURE | COUNTER-MEASURE (1) | COUNTER-MEASURE (2) | COUNTER-MEASURE (3) |
|---|---|---|---|---|---|---|---|---|
| | | | REMAINING RISK PREDICTION VALUE | RISK VALUE INVOLVING COUNTERMEASURE SUSPENSION EXPECTATION | | | | |
| TOTAL | | 90 | 90 | | 90 | | | |
| | SERVER | 10 | 10 | | 10 | ☐(5) | ☐(4) | ☐(3) |
| | CLIENT | 80 | 80 | | 80 | | | |
| | PRIORITY: HIGH | 10 | 10 | | 10 | ☐(8) | ☐(5) | ☐(2) |
| | PRIORITY: MEDIUM | 15 | 15 | | 15 | ☐(5) | ☐(10) | ☐(5) |
| | PRIORITY: LOW | 55 | 55 | | 55 | ☐(10) | ☐(50) | ☐(5) |

| COUNTER MEASURE (1) | DESCRIPTION OF COUNTERMEASURE (1) |
|---|---|
| COUNTER MEASURE (2) | DESCRIPTION OF COUNTERMEASURE (2) |
| COUNTER MEASURE (3) | DESCRIPTION OF COUNTERMEASURE (3) |

FIG. 7

| SECURITY RISK | COUNTERMEASURE | TYPE OF OPERATION INFORMATION |
|---|---|---|
| VULNERABILITY A | ⟨COUNTERMEASURE (1)⟩ APPLY PATCH AAAA AND REBOOT | PATCH APPLICATION HISTORY |
| | | REBOOT HISTORY |
| | | CONTINUOUS OPERATION TIME |
| | ⟨COUNTERMEASURE (2)⟩ STOP PROCESS ZZZZ | PROCESS ZZZZ OPERATION HISTORY |
| | ⟨COUNTERMEASURE (3)⟩ BLOCK PORT 1027 | PORT 1027 USAGE HISTORY |
| | ·· | ·· |
| ·· | | |

FIG. 8

| MANAGEMENT OBJECT TERMINAL | APPLICABLE COUNTERMEASURE | OPERATION INFORMATION | |
|---|---|---|---|
| TERMINAL A | COUNTERMEASURE (1) | PATCH APPLICATION HISTORY | 2015/5/7 (THU) 9:51 PATCH BBBB APPLICATION<br>2015/5/21 (THU) 9:46 PATCH CCCC APPLICATION |
| | | REBOOT HISTORY | 2015/5/7 (THU) 10:00<br>2015/5/14 (THU) 10:00<br>2015/5/21 (THU) 10:00 |
| | | CONTINUOUS OPERATION TIME | 9060MIN |
| | COUNTERMEASURE (3) | PORT 1027 USAGE HISTORY | 2015/5/25 (MON) 13:25 192.168.1.27<br>2015/5/26 (TUE) 9:21 192.168.1.185 |
| | COUNTERMEASURE (2) | PROCESS ZZZZ OPERATION HISTORY | 2015/5/26 (TUE) 14:36 START<br>2015/5/26 (TUE) 14:39 STOP |
| TERMINAL B | ‥ | ‥ | ‥ |
| ‥ | | | |

FIG. 9

| | AFTER IMMEDIATE EXECUTION | NEXT DAY | AFTER ONE WEEK | AFTER ONE MONTH | AFTER THREE MONTHS |
|---|---|---|---|---|---|
| TOTAL | 22 | 13 | 6 | 2 | 0 |
| SERVER | 8 | 8 | 5 | 2 | 0 |
| CLIENT | 14 | 5 | 1 | 0 | 0 |
| PRIORITY: HIGH | 3 | 1 | 0 | 0 | 0 |
| PRIORITY: MEDIUM | 4 | 1 | 0 | 0 | 0 |
| PRIORITY: LOW | 7 | 3 | 1 | 0 | 0 |

FIG. 10

VULNERABILITY DISPLAY SCREEN

VULNERABILITY A OVERVIEW

| | | WITH RISK | ▼AFTER ONE WEEK | | REMAINING RISK AFTER COUNTER-MEASURE | COUNTER-MEASURE (1) | COUNTER-MEASURE (2) | COUNTER-MEASURE (3) |
|---|---|---|---|---|---|---|---|---|
| | | | REMAINING RISK PREDICTION VALUE | RISK VALUE INVOLVING COUNTERMEASURE SUSPENSION EXPECTATION | | | | |
| TOTAL | | 90 | 6 | 11 | 0 | | | |
| SERVER | | 10 | 5 | 6 | 0 | ■(5) | ■(4) | ■(1) |
| CLIENT | | 80 | 1 | 5 | 0 | | | |
| | PRIORITY: HIGH | 10 | 0 | 1 | 0 | ■(8) | ■(2) | □(2) |
| | PRIORITY: MEDIUM | 15 | 0 | 0 | 0 | ■(5) | ■(10) | □(5) |
| | PRIORITY: LOW | 55 | 1 | 4 | 0 | ■(10) | ■(45) | □(5) |

| COUNTER MEASURE (1) | DESCRIPTION OF COUNTERMEASURE (1) |
| COUNTER MEASURE (2) | DESCRIPTION OF COUNTERMEASURE (2) |
| COUNTER MEASURE (3) | DESCRIPTION OF COUNTERMEASURE (3) |

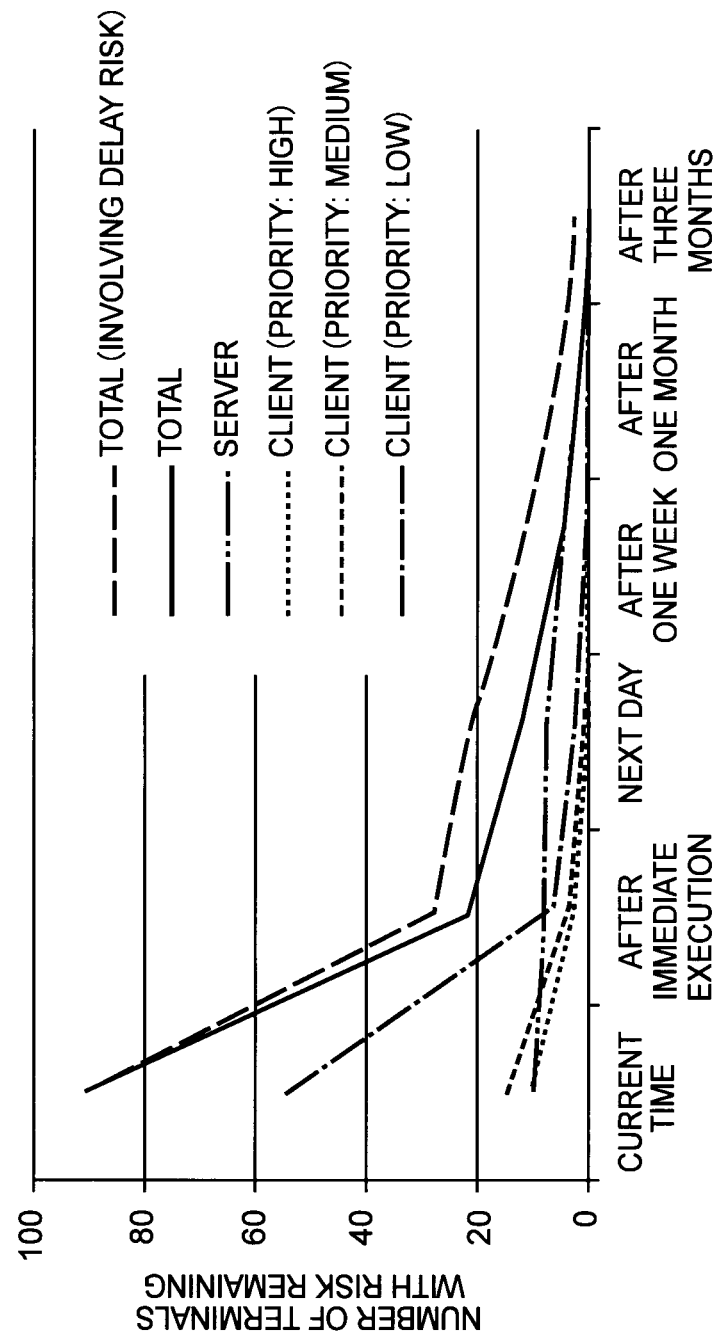

FIG. 12

DISPLAY SCREEN OF TERMINAL FOR WHICH COUNTERMEASURE IS TO BE PROMOTED PREFERENTIALLY

| # | VIOLATION STATE SUSPENSION RESULT | | | REASON OF EXCLUSION FROM MANDATORY APPLICATION | OPERATION STATUS | | VARIOUS TERMINAL INFORMATION | COUNTERMEASURE PROMOTION |
|---|---|---|---|---|---|---|---|---|
| | NUMBER OF ▼ SUSPENSION CASES (CASES) | AVERAGE NUMBER ▼ OF SUSPENSION DAYS (DAYS) | HISTORY OF SUSPENSION WITH REASON | | COUNTER-MEASURE IMPLEMENTATION PREDICTED DATE AND TIME ▼ | OTHERS | | MANDATORY APPLICATION ACTIVATION CHECK |
| 1 | 20 | 15 | — | — | IMMEDIATE | REBOOT CYCLE, POWER ON/OFF HISTORY, ETC. | TERMINAL MANAGER NAME, IP ADDRESS, HOST NAME, CONTACT INFORMATION, ETC. | ■~71 ACTIVATION TIMING: IMMEDIATE |
| 2 | 12 | 10 | SCHEDULED TO BE IMPLEMENTED ON FRIDAY NIGHT | — | IMMEDIATE | | | ■~71 ACTIVATION TIMING: IMMEDIATE |
| 3 | 10 | 10 | — | EXTERNAL LOAD IS UNDESIRABLE FOR BUSINESS REASON | AFTER ONE WEEK | | | □~71 ACTIVATION TIMING: AFTER ONE WEEK |
| .. | .. | .. | .. | .. | .. | .. | .. | .. |

72 — COUNTERMEASURE PROMOTION EXECUTION BUTTON

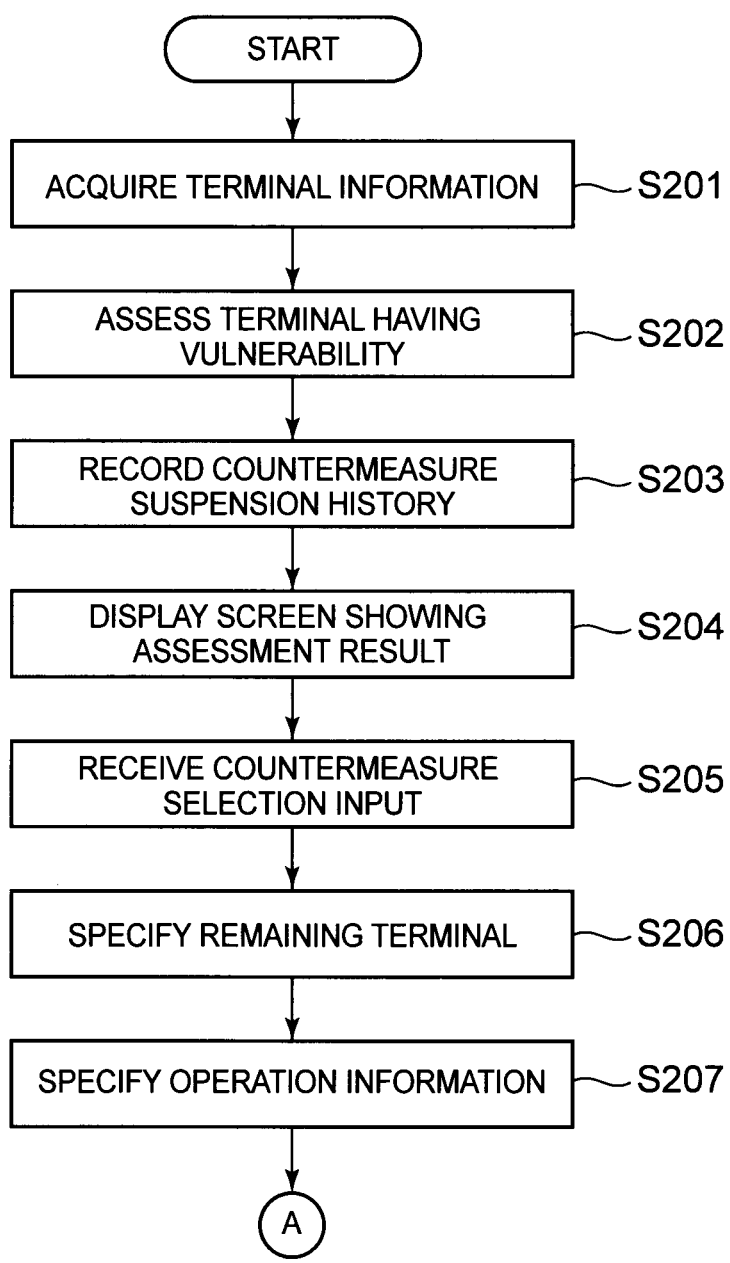

INFORMATION PROCESSING DEVICE, INFORMATION PROCESSING METHOD, AND COMPUTER-READABLE RECORDING MEDIUM

This application is based upon and claims the benefit of priority from Japanese Patent Application No. 2017-060588, filed on Mar. 27, 2017, the disclosure of which is incorporated herein in its entirety by reference.

BACKGROUND OF THE INVENTION

1. Field of the Invention

The present invention relates to an information processing device, an information processing method, and a computer-readable recording medium.

2. Description of the Related Art

Terminals on networks carry security risks such as vulnerabilities in hardware and software and threats associated with external attacks. There are typically a plurality of countermeasures against security risks.

However, countermeasures other than patch application against vulnerabilities cannot be applied to all terminals, because communication restrictions, setting changes, and the like differ among the terminals. Accordingly, in the case of taking a countermeasure for many terminals, formulating the countermeasure is costly.

In view of this, inventions for assisting the formulation of countermeasures (measures) against security risks existing in each terminal have been proposed recently. For example, Japanese Patent No. 5304243 discloses an invention of analyzing a security risk based on the state of a running system and, in consideration of various restrictions in the running system, presenting an optimum countermeasure from among countermeasure candidates for reducing the security risk.

A security manager in a company or a large division needs to recognize the risk status. The security manager reports, to his or her superior, when the risk can be eliminated, and calculates a required period and man-hours for eliminating the risk. Regarding a risk with a high level of importance, the security manager is instructed to report the status of the measure or accelerate the measure.

SUMMARY OF THE INVENTION

An example object of the present invention is to provide an information processing device, an information processing method, and a computer-readable recording medium that can predict, in expectation of a delay of a countermeasure, the number of terminals with a security risk remaining in the future.

An information processing device according to the present invention includes: selection reception means for receiving an input indicating selection of at least one countermeasure from a plurality of countermeasures applicable to terminals having a security risk; operation information specification means for, with use of terminal-specific countermeasure information indicating an applicable countermeasure for each terminal against the security risk and definition information defining a correspondence relationship between a type of operation information of the terminal and a countermeasure against the security risk, specifying a type of operation information corresponding to the countermeasure applicable to the terminal; operation information acquisition means for acquiring operation information of the type specified by the operation information specification means, from among operation information of the terminal; remaining terminal specification means for specifying each remaining terminal that is a terminal in which the security risk remains in the case where the countermeasure received by the selection reception means is applied, based on the terminal-specific countermeasure information; prediction means for, based on the operation information acquired by the operation information acquisition means, predicting the number of remaining terminals at a future time, and predicting the number of remaining terminals at the future time in expectation of the number of countermeasure suspension days that is the number of delay days from a scheduled date of countermeasure application in the past to an actual date of countermeasure application in the past; and presentation means for presenting a result of the prediction by the prediction means.

An information processing method according to the present invention includes: receiving an input indicating selection of at least one countermeasure from a plurality of countermeasures applicable to terminals having a security risk; with use of terminal-specific countermeasure information indicating an applicable countermeasure for each terminal against the security risk and definition information defining a correspondence relationship between a type of operation information of the terminal and a countermeasure against the security risk, specifying a type of operation information corresponding to the countermeasure applicable to the terminal; acquiring operation information of the specified type, from among operation information of the terminal; specifying each remaining terminal that is a terminal in which the security risk remains in the case where the selected countermeasure is applied, based on the terminal-specific countermeasure information; based on the acquired operation information, predicting the number of remaining terminals at a future time, and predicting the number of remaining terminals at the future time in expectation of the number of countermeasure suspension days that is the number of delay days from a scheduled date of countermeasure application in the past to an actual date of countermeasure application in the past; and presenting a result of the prediction.

A computer-readable recording medium according to the present invention stores therein a program for causing a computer to execute: a selection reception process of receiving an input indicating selection of at least one countermeasure from a plurality of countermeasures applicable to terminals having a security risk; an operation information specification process of, with use of terminal-specific countermeasure information indicating an applicable countermeasure for each terminal against the security risk and definition information defining a correspondence relationship between a type of operation information of the terminal and a countermeasure against the security risk, specifying a type of operation information corresponding to the countermeasure applicable to the terminal; an operation information acquisition process of acquiring operation information of the type specified in the operation information specification process, from among operation information of the terminal; a remaining terminal specification process of specifying each remaining terminal that is a terminal in which the security risk remains in the case where the countermeasure received in the selection reception process is applied, based on the terminal-specific countermeasure information; a prediction process of, based on the operation information acquired in the operation information acquisition process, predicting the number of remaining terminals at a future time, and predicting the number of remaining terminals at the future time in expectation of the number of countermeasure suspension days that is the number of delay days from a scheduled date of countermeasure application in the past to an actual date of countermeasure application in the past; and a presentation process of presenting a result of the prediction in the prediction process.

BRIEF DESCRIPTION OF THE DRAWINGS

FIG. 2 It is an explanatory diagram depicting an example of terminal information.

FIG. 3 It is an explanatory diagram depicting an example of terminal-specific countermeasure information.

FIG. 4 It is an explanatory diagram depicting an example of a countermeasure implementation history.

FIG. 5 It is an explanatory diagram depicting an example of classification information.

FIG. 6 It is an explanatory diagram depicting an example of a screen for receiving a countermeasure selection input.

FIG. 7 It is an explanatory diagram depicting an example of definition information.

FIG. 8 It is an explanatory diagram depicting an example of operation information.

FIG. 9 It is an explanatory diagram depicting an example of remaining risk prediction value prediction results.

FIG. 10 It is an explanatory diagram depicting an example of a screen presented by a presentation unit.

FIG. 11 It is an explanatory diagram depicting an example of a graph representing prediction results in time series.

FIG. 12 It is an explanatory diagram depicting an example of a screen showing a list of terminals whose number of countermeasure suspension days is 1 or more days.

FIG. 13 It is a flowchart depicting an example of a procedure according to the present invention.

DESCRIPTION OF THE PREFERRED EMBODIMENTS

Example Embodiment

An example embodiment of the present invention is described below, with reference to drawings.

Figure 1:
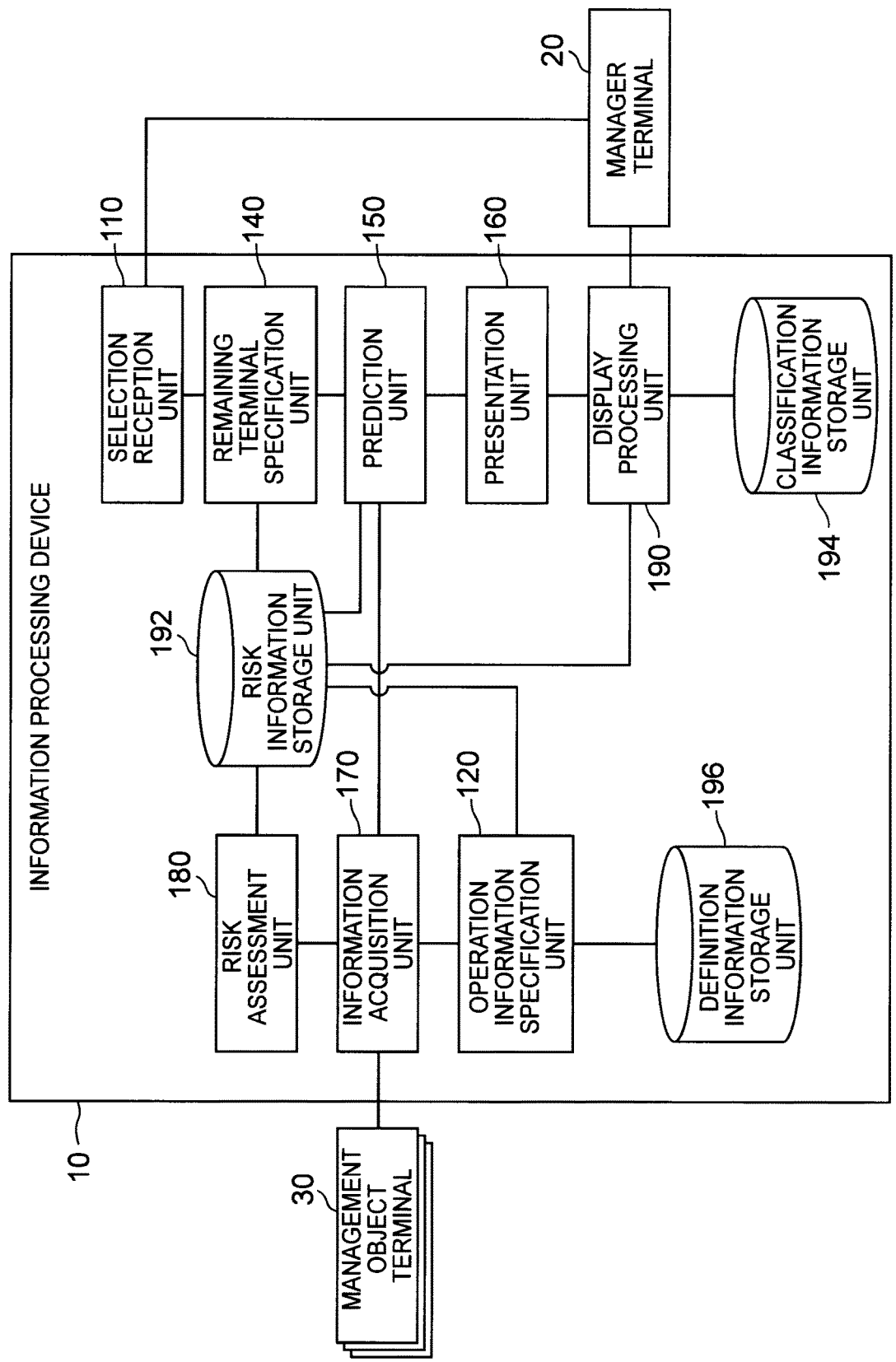
FIG. 1 It is a block diagram depicting an example of the structure of an information processing device according to the present invention.

FIG. 1 is a block diagram depicting an example of the structure of an information processing device according to the present invention. An information processing device 10 according to the present invention includes a selection reception unit 110, an operation information specification unit 120, a remaining terminal specification unit 140, a prediction unit 150, a presentation unit 160, an information acquisition unit 170, a risk assessment unit 180, a display processing unit 190, a risk information storage unit 192, a classification information storage unit 194, and a definition information storage unit 196.

The information processing device 10 is connected to a manager terminal 20 and a plurality of management object terminals 30.

The manager terminal 20 is a terminal operated by a security manager. For example, the manager terminal 20 is a stationary personal computer (PC) or a tablet terminal.

Each management object terminal 30 is, for example, communication equipment on a network such as a client terminal, a server, a switch, or a router. Each management object terminal 30 is, however, not limited to such communication equipment, and may be any thing (i.e. the Internet of things (IoT)) having a function of connecting to the network or means for communicating via the network.

In the following description, "security risk" includes a vulnerability in a management object terminal 30 or a threat associated with an external attack on the management object terminal 30. "Countermeasure" is a measure for eliminating, avoiding, or reducing the vulnerability or the threat. "Applicable countermeasure" is a measure that can be taken for the management object terminal 30 from among measures against the vulnerability or the threat.

The information acquisition unit 170 acquires terminal information from each management object terminal 30. FIG. 2 is an explanatory diagram depicting an example of the terminal information. For example, the terminal information includes information such as the type of an operating system (OS) in the management object terminal 30, the version of the OS, and various applications installed in the management object terminal 30. The terminal information is, however, not limited to the information depicted in FIG. 2.

The information acquisition unit 170 also performs an operation of acquiring, from each management object terminal 30, operation information of a type specified by the operation information specification unit 120. The operation of the operation information specification unit 120, the operation information, the operation information types, etc. will be described later.

The risk assessment unit 180 assesses each management object terminal 30 having a security risk by checking the terminal information acquired by the information acquisition unit 170 against security risk-related information provided from each vendor or the like, and generates risk information including terminal-specific countermeasure information.

The terminal-specific countermeasure information is information indicating an applicable countermeasure (or countermeasures) for each management object terminal 30 against the security risk. FIG. 3 is an explanatory diagram depicting an example of the terminal-specific countermeasure information in the case where the security risk is vulnerability A. The terminal-specific countermeasure information includes terminal identification information (e.g. media access control (MAC) address) for identifying each management object terminal 30, and information indicating a countermeasure (or countermeasures) applicable to the management object terminal 30. For example, the terminal-specific countermeasure information is generated by assessing beforehand each management object terminal 30 based on information provided from each vendor or the like and indicating security risks, countermeasures against the security risks, and the like, and stored in the risk information storage unit 192. In the example depicted in FIG. 3, for vulnerability A, "countermeasure (1)" and "countermeasure (3)" are applicable to terminal A, "countermeasure (2)" is applicable to terminal B, and "countermeasure (3)" is applicable to terminal C.

For example, in the case where the security risk is vulnerability A, the risk information may include not only the terminal-specific countermeasure information depicted in FIG. 3, but also an overview of vulnerability A, description of each countermeasure, etc. The risk assessment unit 180 stores the generated risk information in the risk information storage unit 192.

The risk information storage unit 192 is a storage device for storing the above-mentioned risk information and a countermeasure implementation history for each security risk in each management object terminal 30. FIG. 4 is an explanatory diagram depicting an example of the countermeasure implementation history of terminal A. For example, the countermeasure implementation history includes, for each security risk, an assessment start date, a countermeasure scheduled date, a countermeasure implementation result, and the number of countermeasure suspension days, as depicted in FIG. 4. The countermeasure implementation history is generated for each management object terminal 30. The countermeasure scheduled date is a scheduled date of a countermeasure against the security risk in the past. The countermeasure implementation result is a date of actual application (implementation) of the countermeasure to the management object terminal 30. The number of countermeasure suspension days is the number of delay days from the countermeasure scheduled date to the countermeasure implementation result. The assessment start date is a date of starting an assessment of the countermeasure application delay. The number of countermeasure suspension days being 1 or more days suggests that the application of the countermeasure against the security risk was delayed for some reason. The risk assessment unit 180 may generate, for each management object terminal 30, the countermeasure implementation history as depicted in FIG. 4 with reference to information such as assessment start date, countermeasure scheduled date, and countermeasure implementation result for each security risk in each management object terminal 30, and store the generated countermeasure implementation history in the risk information storage unit 192.

The classification information storage unit 194 is a storage device for storing classification information. The classification information indicates a classification of each management object terminal 30. FIG. 5 is an explanatory diagram depicting an example of the classification information. In the classification information depicted in FIG. 5, terminal identification information (e.g. MAC address) is associated with two types of classification information (terminal type and priority). In detail, each management object terminal 30 is first classified into "server" or "client", and each management object terminal 30 corresponding to "client" is further classified into "priority: high", "priority: medium", or "priority: low".

The selection reception unit 110 receives an input indicating selection of at least one countermeasure from a plurality of countermeasures applicable to management object terminals 30 having the security risk. For example, the selection reception unit 110 receives a selection input of a countermeasure against the security risk (vulnerability A in this example) via a screen depicted in FIG. 6.

The display processing unit 190 generates the screen depicted in FIG. 6, and displays the screen on a display unit (not depicted) of the manager terminal 20. FIG. 6 depicts an example of the screen in the case where the security risk is vulnerability A. The display processing unit 190 references to the classification information, and generates, for each classification of management object terminal 30, a screen associating the number of management object terminals 30 having vulnerability A ("with risk"), the number of remaining risks (management object terminals 30 in which vulnerability A remains) after each countermeasure if the countermeasure is executed ("remaining risk after countermeasure"), a remaining risk prediction value at a future time (after one week in this example) ("remaining risk prediction value"), a remaining risk prediction value at the future time in expectation of the result of the number of countermeasure suspension days ("risk value involving countermeasure suspension expectation"), and each countermeasure against vulnerability A ("countermeasure (1)", "countermeasure (2)", and "countermeasure (3)") with each other (see FIG. 6). The number in the parentheses in the field of the column of each countermeasure indicates the number of management object terminals 30 to which the countermeasure corresponding to the column is applicable from among the management object terminals 30 corresponding to the classification corresponding to the row in which the number is included. In the screen depicted in FIG. 6, an overview of vulnerability A and description of each countermeasure against vulnerability A are displayed, too. For example, in the screen depicted in FIG. 6, of ten servers having vulnerability A, "countermeasure (1)" is applicable to five servers, "countermeasure (2)" is applicable to four servers, and "countermeasure (3)" is applicable to three servers. Here, the sum of the numbers of countermeasure-specific servers differs from the number of servers as a parameter (ten), because there are servers to which a plurality of countermeasures are applicable. Although the server row is used here as an example, the same applies to the other rows.

Clicking a downward black triangle displayed on the screen depicted in FIG. 6 causes a drop-down list indicating selectable future times (e.g. immediate, next day, after one week, after one month, etc.) to be displayed. When a future time is selected from the drop-down list, the prediction values at the selected future time (after one week in this example) are displayed as the remaining risk prediction value and the risk value involving countermeasure suspension expectation.

The display processing unit 190 generates the screen depicted in FIG. 6, based on the terminal-specific countermeasure information (see FIG. 3), the classification information (see FIG. 5), and the like.

The selection reception unit 110 receives an input indicating selection of a countermeasure as a result of the security manager clicking a button corresponding to a combination of a classification of management object terminal 30 and a countermeasure on the screen depicted in FIG. 6. A plurality of buttons may be clicked on the screen depicted in FIG. 6.

The remaining terminal specification unit 140 reads the terminal-specific countermeasure information from the risk information storage unit 192 and, based on the terminal-specific countermeasure information, specifies each management object terminal 30 in which the security risk remains (hereafter also referred to as "remaining terminal") if the countermeasure indicated by the selection input received by the selection reception unit 110 is executed. The remaining terminal specification unit 140 can specify each management object terminal 30 to which the countermeasure indicated by the selection input is applicable, based on the terminal-specific countermeasure information depicted in FIG. 3. At the same time, the remaining terminal specification unit 140 can specify each management object terminal 30 (remaining terminal) in which the security risk remains.

The security manager checks the screen (e.g. the screen depicted in FIG. 6) displayed on the manager terminal 20, and performs a selection input of a countermeasure to be applied against vulnerability A. The input result is sent to the selection reception unit 110. The selection reception unit 110 receives a selection input for each classification, via the screen depicted in FIG. 6. Based on the selection input for each classification, the remaining terminal specification unit 140 specifies, for the classification, each remaining terminal if the countermeasure selected for the classification is executed.

Information defining the correspondence relationship between the type of operation information of management object terminal 30 and the countermeasure against the security risk is referred to as "definition information".

The operation information is information including at least one of: information (operation history information) indicating the history of an operation or process actually performed in the management object terminal 30; and information (operation schedule information) indicating an operation or process scheduled to be performed in the management object terminal 30 in the future. The operation information is generated in each management object terminal 30 in response to the execution of a predetermined operation or process or the input of execution schedule of a predetermined operation or process in the management object terminal 30, and stored in a storage unit in the management object terminal 30. The "type of operation information" denotes a classification to which the operation information belongs. Examples of "type of operation history information" include "patch application history", "reboot history", "continuous operation time", "port usage history", "process operation history", and "application usage history". Examples of "type of operation schedule information" include "patch application scheduled date and time", "reboot scheduled date and time", and "application start scheduled date and time". The types of operation information are, however, not limited to these examples.

The definition information storage unit 196 is a storage device for storing the definition information. FIG. 7 is an explanatory diagram depicting an example of the definition information. The definition information is information defining the correspondence relationship between the type of operation information and the countermeasure against the security risk, as mentioned above. FIG. 7 depicts the definition information in the case where the security risk is vulnerability A. In FIG. 7, each countermeasure ("countermeasure (1)", "countermeasure (2)", and "countermeasure (3)") against vulnerability A and the type of operation information of the management object terminal 30 referenced to when determining whether or not to apply the countermeasure are stored in association with each other. In the example depicted in FIG. 7, "countermeasure (1)" is a countermeasure of applying patch AAAA and rebooting. "Countermeasure (2)" is a countermeasure of stopping process ZZZZ.

"Countermeasure (3)" is a countermeasure of blocking port 1027. "Type of operation information" corresponding to "countermeasure (1)" is "patch application history", "reboot history", and "continuous operation time". "Type of operation information" corresponding to "countermeasure (2)" is "process ZZZZ operation history". "Type of operation information" corresponding to "countermeasure (3)" is "port 1027 usage history".

The definition information may be, for example, delivered from a server device (not depicted) to the information processing device 10.

The operation information specification unit 120 specifies, for each management object terminal 30, an applicable countermeasure and a type of operation information corresponding to the countermeasure, for example based on the terminal-specific countermeasure information depicted in FIG. 3 and the definition information depicted in FIG. 7. In detail, the operation information specification unit 120 specifies that "countermeasure (1)" and "countermeasure (3)" are applicable to terminal A against vulnerability A, based on the terminal-specific countermeasure information depicted in FIG. 3. The operation information specification unit 120 then specifies that "type of operation information" corresponding to "countermeasure (1)" is "patch application history", "reboot history", and "continuous operation time", based on the definition information depicted in FIG. 7. The operation information specification unit 120 also specifies that "type of operation information" corresponding to "countermeasure (3)" is "port 1027 usage history", based on the definition information depicted in FIG. 7. The operation information specification unit 120 specifies an applicable countermeasure (only countermeasure (2)) and a type of operation information ("process ZZZZ operation history") corresponding to the countermeasure for terminal B, as with terminal A.

The information acquisition unit 170 acquires the operation information of the type specified by the operation information specification unit 120. For example, the information acquisition unit 170 acquires the operation information of the type specified by the operation information specification unit 120 from among the operation information of the management object terminal 30, in the following manner.

As an example, the information acquisition unit 170 notifies the management object terminal 30 of the type specified by the operation information specification unit 120, and receives the operation information of the type as a response from the management object terminal 30. Alternatively, the information acquisition unit 170 may acquire the operation information stored in the management object terminal 30, and extract the operation information of the type specified by the operation information specification unit 120 from the acquired operation information. Here, the information acquisition unit 170 may acquire necessary operation information from all operation information stored in the management object terminal 30. Alternatively, the information acquisition unit 170 may acquire necessary operation information from operation information within a predetermined period (e.g. one month) stored in the management object terminal 30. The operation information may include information about an operation history within a past predetermined period (e.g. past one month), such as information about rebooting performed in the past, information about a port number accessed in the past, and information about a process executed in the past. As another example, the operation information may include information about an operation schedule in a predetermined period in the future (e.g. future one month), such as information about rebooting scheduled to be executed in the future, information about a port number scheduled to be accessed in the future, and information about a process scheduled to be executed in the future. The operation information may be a combination of these information. In the case where the management object terminal 30 is managed by a subsystem, the information acquisition unit 170 may acquire future operation information from the subsystem.

FIG. 8 is an explanatory diagram depicting an example of the operation information acquired by the information acquisition unit 170. FIG. 8 depicts an example of the operation information in the case where the security risk is vulnerability A. The information acquisition unit 170 acquires, for "countermeasure (1)" applicable to terminal A, operation information "patch application history", "reboot history", and "continuous operation time" from terminal A, based on the type of operation information specified by the operation information specification unit 120. The information acquisition unit 170 acquires, for "countermeasure (3)" applicable to terminal A, "port 1027 usage history" from terminal A, based on the type of operation information specified by the operation information specification unit 120. Regarding terminal B as with terminal A, the information acquisition unit 170 acquires, for "countermeasure (2)" applicable to terminal B, operation information "process ZZZZ operation history" from terminal B.

The prediction unit 150 predicts the number of management object terminals 30 (remaining terminals) in which the security risk remains at the future time, based on the operation information acquired by the information acquisition unit 170. For example, the prediction unit 150 can make the following prediction for terminal A, according to the operation information depicted in FIG. 8. It is assumed here that the prediction unit 150 references to the operation information depicted in FIG. 8, on 2015/5/27 (Wed). The prediction unit 150 can determine periodic reboot timing, by referencing to "reboot history" associated with "countermeasure (1)". In the case where, in the operation information, the "reboot schedule" field is provided instead of the "reboot history" field and indicates future reboot schedule information, the prediction unit 150 can predict or determine reboot execution timing by referencing to "reboot schedule". Moreover, the prediction unit 150 can determine periodic patch application timing, by referencing to "patch application history" associated with "countermeasure (1)". In detail, it can be read that terminal A is periodically applied with a patch and rebooted every Thursday morning. From this, the prediction unit 150 can predict the application timing of "countermeasure (1)", i.e. the timing of applying patch AAAA and rebooting, as "next Thursday (2015/5/28) morning". The past reboot history indicates that, of the past three reboots, three reboots were performed at 10:00 Thursday. Based on this periodicity, the next reboot can be predicted to be performed at 10:00 Thursday. As another method, the prediction unit 150 may count the number of reboots for each day of the week, and make such prediction that reboot is likely to be performed on the day of the week in descending order of the count.

Moreover, the prediction unit 150 can determine port 1027 usage history, by referencing to "port 1027 usage history" associated with "countermeasure (3)". In detail, it can be read that terminal A uses port 1027 two successive days, i.e. two days and one day before the date. In the case where "port 1027 usage history" includes information of a plurality of usage dates and times in this way, the prediction unit 150 may determine that there is a possibility that the port 1027 is also used in the future, and set the application timing of "countermeasure (3)", i.e. the timing of blocking port 1027, to a timing after a lapse of a predetermined number of days set relatively long. Alternatively, the prediction unit 150 may exclude "countermeasure (3)" from date and time prediction for terminal A. In other words, the prediction unit 150 may determine not to apply "countermeasure (3)" to terminal A. Here, the prediction unit 150 predicts the timing of blocking port 1027 to be a timing (e.g. 2015/6/3 (Wed) after one week) after the predetermined number of days set relatively long, as in the former case. The predetermined number of days may be set beforehand. The prediction unit 150 can thus predict countermeasure execution timing easily.

For each management object terminal 30 other than the remaining terminals specified by the remaining terminal specification unit 140, the prediction unit 150 predicts the application timing of applying the applicable countermeasure in the aforementioned way. In detail, for each management object terminal 30 other than the remaining terminals, the prediction unit 150 specifies an applicable countermeasure based on the terminal-specific countermeasure information depicted in FIG. 3, and predicts the application timing of the applicable countermeasure based on the operation information depicted in FIG. 8. The prediction unit 150 assumes, for each management object terminal 30 other than the remaining terminals, that the applicable countermeasure is executed at the predicted application timing and vulnerability A is eliminated. For example, for terminal A, the prediction unit 150 predicts the application timing of "countermeasure (1)" as "2015/5/28 (Thu) morning", and the application timing of "countermeasure (3)" as "2015/6/3 (Wed)", as mentioned above. The prediction unit 150 accordingly assumes that vulnerability A in terminal A is eliminated on 2015/5/28 (Thu) morning which is earlier. According to such assumption, the prediction unit 150 counts, for each future time (e.g. immediate, next day, after one week, after one month, etc.) in time series, the number of management object terminals 30 (remaining terminals) in which vulnerability A remains at the time, up to a future time at which the number of remaining terminals is less than or equal to a predetermined number (e.g. 0). The prediction unit 150 sets the count as the prediction value of remaining risks (management object terminals 30 in which vulnerability A remains).

The prediction unit 150 performs such remaining risk prediction value derivation for each classification of management object terminal 30. FIG. 9 is an explanatory diagram depicting an example of the prediction results in the case where the security risk is vulnerability A. FIG. 9 depicts an example of the prediction results in the case where, on the screen depicted in FIG. 6, "countermeasure (1)", "countermeasure (2)", and "countermeasure (3)" are selected for "server", and "countermeasure (1)" and "countermeasure (2)" are selected for all of "priority: high", "priority: medium", and "priority: low" of "client". In the example depicted in FIG. 9, the predetermined number is 0. The remaining risk value prediction results up to "after three months" when the total number of remaining terminals is less than or equal to 0 are depicted here. In the example depicted in FIG. 9, the number of remaining terminals classified as "server" is predicted to be 8 "after immediate execution", 8 on "next day", 5 "after one week", 2 "after one month", and 0 "after three months".

Apart from the remaining risk prediction value, the prediction unit 150 also predicts "risk value involving countermeasure suspension expectation". The risk value involving countermeasure suspension expectation is the prediction value of the number of remaining risks in the case of involving expectation of the number of countermeasure suspension days indicated by the countermeasure implementation history depicted in FIG. 4.

In the case of predicting "risk value involving countermeasure suspension expectation", the prediction unit 150 determines the timing of applying the countermeasure to the management object terminal 30, to be the timing obtained by delaying, by a suspension period (a period of a delay by which the countermeasure is behind schedule), the timing in the case of predicting "remaining risk prediction value".

Here, the prediction unit 150 calculates the suspension period for each terminal. For example, the prediction unit 150 may calculate the average value of the numbers of countermeasure suspension days for the respective security risks, as the suspension period. Suppose, for example, the information depicted in FIG. 4 is obtained as the countermeasure implementation history of terminal A. In this case, the prediction unit 150 calculates the average value of the number of countermeasure suspension days "0 day" corresponding to vulnerability A, the number of countermeasure suspension days "1 day" corresponding to vulnerability B, the number of countermeasure suspension days "7 days" corresponding to vulnerability C, etc., and sets the value as the suspension period for terminal A.

The prediction unit 150 then predicts the timing of applying the countermeasure to the management object terminal 30, as in the case of predicting "remaining risk prediction value". An example of this operation is already described above, and so its description is omitted here. The prediction unit 150 calculates the timing obtained by delaying the predicted timing by the suspension period in the management object terminal 30, and sets the calculated timing as the timing of applying the countermeasure to the management object terminal 30.

Suppose, for example, the result of predicting the timing of applying the countermeasure to terminal A is "20XX/YY/ZZ", as in the case of predicting "remaining risk prediction value". Also suppose the suspension period of terminal A is "4 days". In this case, the prediction unit 150 sets the prediction result of the timing of applying the countermeasure to terminal A, to 4 days after "20XX/YY/ZZ".

In this way, the prediction unit 150 changes the timing of applying the countermeasure to the management object terminal 30 using the suspension period. Based on the changed timing, the prediction unit 150 counts, for each future time (e.g. immediate, next day, after one week, after one month, etc.) in time series, the number of management object terminals 30 in which the security risk remains at the time, and sets the count as the prediction value of "risk value involving countermeasure suspension expectation".

For example, the prediction unit 150 may perform the counting up to a future time at which the number of remaining terminals is less than or equal to the predetermined number (e.g. 0), as in the case of predicting "remaining risk prediction value".

The presentation unit 160 then displays, for example, a screen depicted in FIG. 10. FIG. 10 is an explanatory diagram depicting an example of the screen presented by the presentation unit 160. FIG. 10 depicts the screen in the case where the security risk is vulnerability A. The screen depicted in FIG. 10 includes the number of remaining terminals for each classification, and the total number of remaining terminals (remaining risk after countermeasure). The screen depicted in FIG. 10 also includes the prediction value of the number of remaining terminals at a future time for each classification, and the prediction value of the total number of remaining terminals (remaining risk prediction value). The screen depicted in FIG. 10 also includes the prediction value of the number of remaining terminals at the future time in the case of expecting the suspension period for each classification, and the prediction value of the total number of remaining terminals (risk value involving countermeasure suspension expectation).

In the screen depicted in FIG. 10, the number in the parentheses in the field of the column of each countermeasure indicates the number of management object terminals 30 in which vulnerability A is eliminated if the countermeasure corresponding to the column is executed, and varies depending on selection of other countermeasures. For example, in the client of "priority: high", the number in the parentheses in the "countermeasure (2)" column is "5" in the screen depicted in FIG. 6, but "2" in the screen depicted in FIG. 10. This means the following: in the case of applying only "countermeasure (2)", the number of clients of "priority: high" in which vulnerability A is eliminated is 5; in the case of applying both "countermeasure (1)" and "countermeasure (2)", vulnerability A is eliminated in three out of the five clients as a result of applying "countermeasure (1)", and vulnerability A is eliminated in the other two clients as a result of applying "countermeasure (2)".

The prediction value of the number of remaining terminals in the case of taking into account the delay of the timing of applying the countermeasure is greater than or equal to the prediction value of the number of remaining terminals in the case of not taking into account the delay of the timing of applying the countermeasure. Hence, in the screen depicted in FIG. 10, the value of "risk value involving countermeasure suspension expectation" is greater than or equal to the value of "remaining risk prediction value" in each classification.

The presentation unit 160 may present, instead of the screen depicted in FIG. 10, a screen showing a graph representing "remaining risk prediction value" for each classification at each future time in time series, as depicted in FIG. 11. FIG. 11 is an explanatory diagram depicting another example of the screen presented by the presentation unit 160. FIG. 11 depicts an example of the screen in the case where the security risk is vulnerability A. Although the number of remaining risks (management object terminals 30 in which vulnerability A remains) at the current time is also included in the graph in FIG. 11, the remaining risks at the current time may be omitted in the graph.

The presentation unit 160 may display a screen showing a graph representing "risk value involving countermeasure suspension expectation" for each classification at each future time in time series, together with the screen depicted in FIG. 11. The mode of the graph representing "risk value involving countermeasure suspension expectation" in time series is the same as the mode of the graph depicted in FIG. 11.

The presentation unit 160 also presents a screen showing a list of terminals whose number of countermeasure suspension days is 1 or more days. FIG. 12 is an explanatory diagram depicting an example of the screen showing a list of terminals whose number of countermeasure suspension days is 1 or more days. Each row in the screen depicted in FIG. 12 represents a terminal whose number of countermeasure suspension days is 1 or more days. As the information of the terminal, the number of suspension cases, the average number of suspension days, history of suspension with reason, reason of exclusion from mandatory application, operation information, various terminal information, etc. are also displayed.

The presentation unit 160 preferably presents a screen including: a graphical user interface (a button 71 depicted in FIG. 12) for the security manager designating a management object terminal 30 whose number of countermeasure suspension days is 1 or more days; and a graphical user interface (a countermeasure promotion execution button 72 depicted in FIG. 12) for notifying the user of the management object terminal 30 designated by the button 71 to apply the countermeasure to the management object terminal 30, as depicted in FIG. 12. In the example depicted in FIG. 12, terminals #1 and #2 are designated from among the management object terminals 30 whose number of countermeasure suspension days is 1 or more days. In the case where the countermeasure promotion execution button 72 is clicked in this state, for example, the information acquisition unit 170 sends, to each of terminals #1 and #2, a notification reminding the user of the terminal of countermeasure suspension. This notification may be made by e-mail as an example.

The screen (for example, see FIGS. 10, 11, and 12) presented by the presentation unit 160 is output from the display processing unit 190 to the manager terminal 20, and displayed on the display unit (not depicted) of the manager terminal 20.

The selection reception unit 110, the operation information specification unit 120, the remaining terminal specification unit 140, the prediction unit 150, the presentation unit 160, the information acquisition unit 170, the risk assessment unit 180, and the display processing unit 190 are, for example, realized by a central processing unit (CPU) of a computer operating according to a program. In this case, for example, the CPU may read the program from a program recording medium such as a program storage device (not depicted in FIG. 1) in the computer, and operate as the selection reception unit 110, the operation information specification unit 120, the remaining terminal specification unit 140, the prediction unit 150, the presentation unit 160, the information acquisition unit 170, the risk assessment unit 180, and the display processing unit 190 according to the program.

Figure 14:
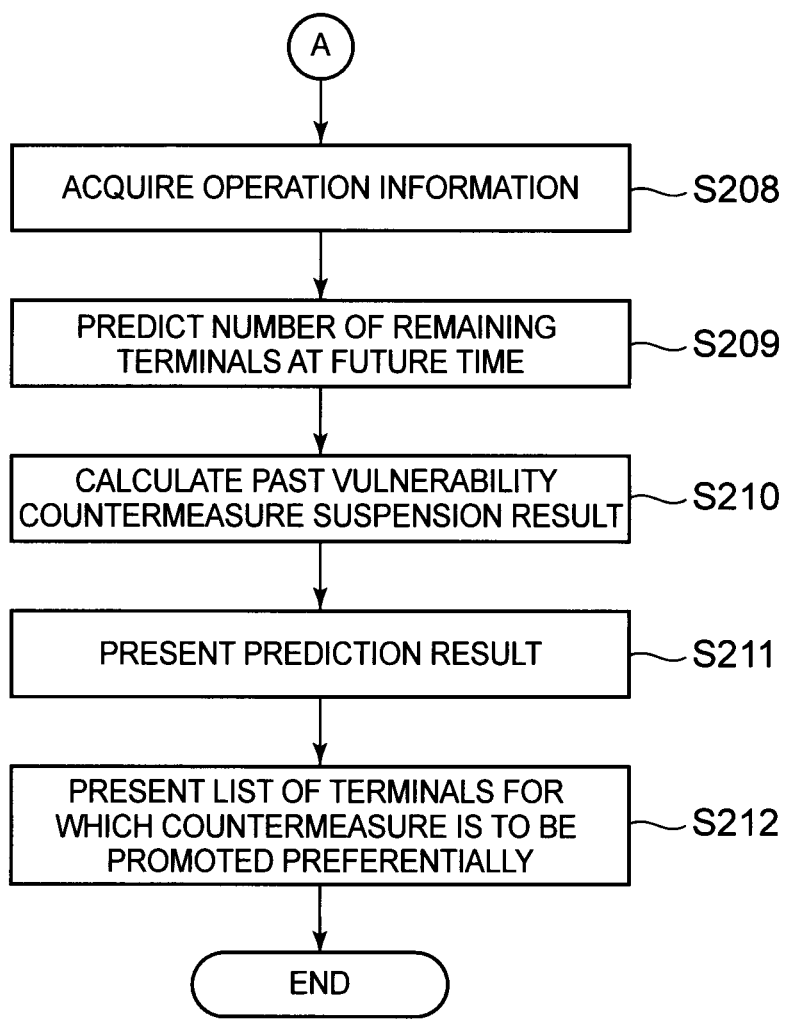
FIG. 14 It is a flowchart depicting an example of the procedure according to the present invention.

An example of the procedure according to the present invention is described below. FIGS. 13 and 14 are a flowchart depicting an example of the procedure according to the present invention. The following describes an example of the operation in the case where the security risk is vulnerability A.

The information acquisition unit 170, for example, acquires the terminal information of each management object terminal 30, in response to a screen display request from the manager terminal 20 (step S201). The risk assessment unit 180, for example, assesses each management object terminal 30 having vulnerability A based on the acquired terminal information of each management object terminal 30, and generates risk information (step S202). The risk assessment unit 180, for example, checks the acquired terminal information of each management object terminal 30 against information related to vulnerability A provided from each vendor or the like, and thus can specify each management object terminal 30 having vulnerability A, applicable processes, and the like.

The risk assessment unit 180 also records countermeasure suspension history (countermeasure implementation history) (step S203). The risk assessment unit 180 generates the countermeasure implementation history depicted in FIG. 4 for each management object terminal 30, by referencing to, for the management object terminal 30, information such as assessment start date, countermeasure scheduled date, and countermeasure implementation result for each security risk (vulnerability A, vulnerability B, vulnerability C, etc.). Here, the risk assessment unit 180 may calculate the number of delay days from the countermeasure scheduled date to the countermeasure implementation result, as the number of countermeasure suspension days. The risk assessment unit 180 stores the countermeasure implementation history generated for each management object terminal 30, in the risk information storage unit 192.

Steps S201 to S203 may be performed in advance, before the reception of the screen display request from the manager terminal 20. In this case, step S204 described below is performed in response to the screen display request from the manager terminal 20.

The display processing unit 190 generates, based on the risk information generated in step S202 and the classification information stored in the classification information storage unit 194, a screen (e.g. the screen depicted in FIG. 6) for displaying the result of assessing each terminal having vulnerability A, and displays the screen on the display unit (not depicted) of the manager terminal 20 (step S204). The security manager who operates the manager terminal 20 checks the contents of the displayed screen, and performs an input operation of selecting at least one of a plurality of countermeasures. The selection reception unit 110 accordingly receives information indicating the countermeasure selected by the input operation in the manager terminal 20, from the manager terminal 20 (step S205). The remaining terminal specification unit 140 specifies the remaining terminals for each classification, based on the information indicating the countermeasure selected by the manager terminal 20 and the terminal-specific countermeasure information (step S206). Suppose, for example, the risk information storage unit 192 stores the terminal-specific countermeasure information depicted in FIG. 3, and the selection reception unit 110 receives an input of selecting "countermeasure (1)" and "countermeasure (2)" for "server". In this case, the remaining terminal specification unit 140 specifies at least "terminal C" as a terminal (remaining terminal) to which none of "countermeasure (1)" and "countermeasure (2)" is applicable.

Next, the operation information specification unit 120 specifies the type of operation information corresponding to the countermeasure applicable to the management object terminal 30 (step S207). The information acquisition unit 170 acquires the operation information of the type specified by the operation information specification unit 120, from the management object terminal 30 (step S208). Suppose, for example, the risk information storage unit 192 stores the terminal-specific countermeasure information depicted in FIG. 3, and the definition information storage unit 196 stores the definition information depicted in FIG. 7. In this case, the operation information specification unit 120 specifies, for terminal A, that "countermeasure (1)" and "countermeasure (3)" are applicable. The operation information specification unit 120 further specifies that the type of operation information corresponding to "countermeasure (1)" is "patch application history", "reboot history", and "continuous operation time", and the type of operation information corresponding to "countermeasure (3)" is "port 1027 usage history". The information acquisition unit 170 accordingly acquires, for terminal A, "patch application history", "reboot history", "continuous operation time", and "port 1027 usage history" from among the operation information of terminal A.

Next, the prediction unit 150 predicts the number of remaining terminals (remaining risk prediction value) at a future time for each classification, based on the operation information acquired by the information acquisition unit 170 (step S209). Suppose, for example, the risk information storage unit 192 stores the terminal-specific countermeasure information depicted in FIG. 3, and the information acquisition unit 170 acquires the operation information depicted in FIG. 8. In this case, the prediction unit 150 specifies, for each management object terminal 30 other than the remaining terminals specified by the remaining terminal specification unit 140, an applicable countermeasure based on the terminal-specific countermeasure information depicted in FIG. 3. The prediction unit 150 also predicts the applicable timing of the applicable countermeasure based on the operation information depicted in FIG. 8, and counts the number of remaining terminals for each future time. The prediction unit 150 performs this process for each classification.

The prediction unit 150 further calculates the suspension period for each terminal (step S210). For example, the prediction unit 150 may set the average value of the numbers of countermeasure suspension days for the respective security risks, as the suspension period. Suppose, for example, the risk information storage unit 192 stores the countermeasure implementation history depicted in FIG. 4. In this case, the prediction unit 150 calculates the average value of the numbers of countermeasure suspension days such as "0 day", "1 day", and "7 days", and sets the calculated value as the suspension period of terminal A. In step S210, the prediction unit 150 further calculates the timing obtained by delaying the application timing of the countermeasure predicted in step S209 by the calculated suspension period, and sets the calculated timing as the timing of applying the countermeasure to the management object terminal 30. Thus, the prediction unit 150 changes the application timing of the countermeasure predicted in step S209, based on the suspension period. The prediction unit 150 counts the number of remaining terminals for each future time, based on the changed timing (countermeasure application timing). The counting result is "risk value involving countermeasure suspension expectation". The prediction unit 150 performs this process for each classification.

Next, the presentation unit 160 presents the prediction result (remaining risk prediction value) obtained by the prediction unit 150 in step S209 and the prediction result (risk value involving countermeasure suspension expectation) obtained by the prediction unit 150 in step S210 (step S211). The presentation unit 160 may present a screen (see FIG. 10) reflecting the prediction result on the screen depicted in FIG. 6. The presentation unit 160 may also present the graph (graph representing the prediction result in time series) as depicted in FIG. 11, for each of "remaining risk prediction value" and "risk value involving countermeasure suspension expectation" for each classification.

The presentation unit 160 then presents a screen of a list of terminals for which a countermeasure is to be promoted preferentially (step S212). The presentation unit 160 presents a screen (e.g. the screen depicted in FIG. 12) showing a list of terminals whose number of countermeasure suspension days is 1 or more days. When presenting the screen depicted in FIG. 12, the presentation unit 160 may display the information of each terminal (management object terminal 30) in descending order of the number of suspension cases. The number of suspension cases is the number of rows in which the countermeasure implementation result is behind the countermeasure scheduled date in the countermeasure implementation history depicted in FIG. 4. When presenting the screen depicted in FIG. 12, the presentation unit 160 may display the information of each terminal (management object terminal 30) in descending order of the suspension period calculated in step S210.

In the case where a countermeasure is postponed for a business reason, the presentation unit 160 may include this information in the screen depicted in FIG. 12. In the case where, for example, there is a reason for avoiding an operation of implementing a countermeasure not manually but mandatorily in the background, the presentation unit 160 may include this reason in the screen depicted in FIG. 12. These information may be registered in the information processing device 10 by the management object terminal 30.

Suppose the security manager designate a management object terminal 30 on the screen depicted in FIG. 12. In the example depicted in FIG. 12, the security manager designates the management object terminal 30 by clicking the button 71, as mentioned above. Also suppose the security manager clicks the countermeasure promotion execution button 72. Then, for example, the information acquisition unit 170 sends, to the designated management object terminal 30, a notification for reminding the user of the management object terminal 30 of countermeasure suspension. In detail, the information acquisition unit 170 sends a message for urging the user of the management object terminal 30 to apply the countermeasure to the management object terminal 30. This notification may be made by e-mail as an example. The destination of the notification may be not the management object terminal 30 but another terminal used by the user of the management object terminal 30.

According to this example embodiment, the number of terminals with a security risk remaining in the future can be predicted in expectation of a delay of a countermeasure.

In the example embodiment, when a management object terminal 30 is designated and the countermeasure promotion execution button 72 is clicked on the screen depicted in FIG. 12, the information processing device 10 sends a message for urging the user of the management object terminal 30 to apply the countermeasure to the management object terminal 30. Having received the notification, the user is likely to apply the countermeasure to the management object terminal 30 more promptly. This can shorten the period to the completion of the countermeasure against the security risk. The level of the security risk can be expressed by the product of the number of management object terminals 30 to which no countermeasure has been applied and the period during which no countermeasure has been applied. Hence, shortening the period to the completion of the countermeasure means that the level of the security risk can be reduced.

The presentation unit 160 may score a value indicating the severity of the countermeasure delay on the screen depicted in FIG. 12, and display the value on the screen depicted in FIG. 12. When the terminal is higher in priority, a higher value is set in advance as a value indicating the level of importance of the terminal. The presentation unit 160 may then calculate the value indicating the severity of the countermeasure delay, as the product of the value indicating the level of importance of the terminal and the suspension period. Presenting such a value to the security manager allows the security manager to easily determine a management object terminal 30 to which a notification for urging countermeasure application is to be sent.

Figure 15:
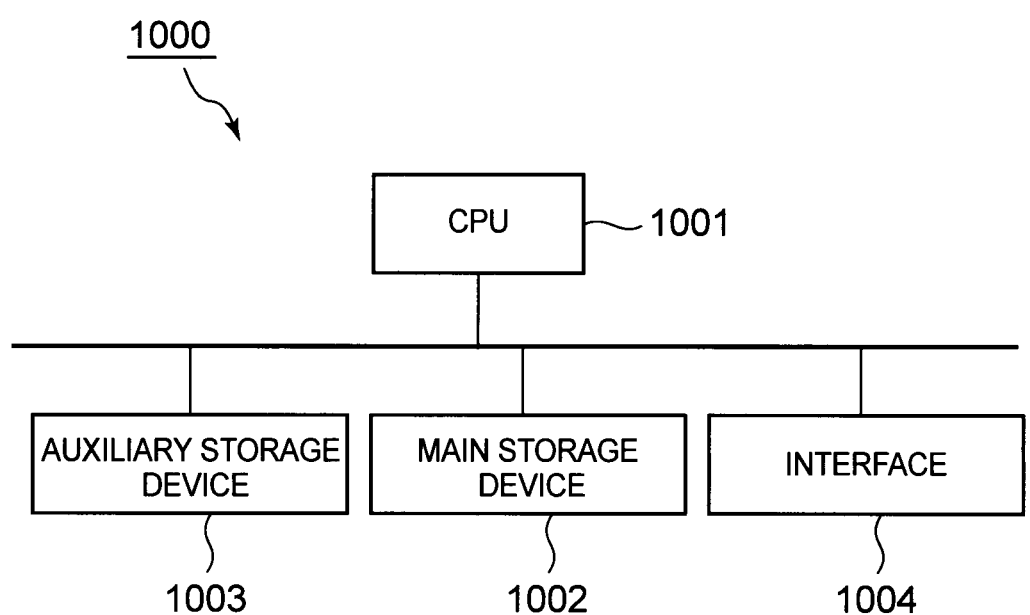
FIG. 15 It is a schematic block diagram depicting an example of the structure of a computer according to an example embodiment of the present invention.

FIG. 15 is a schematic block diagram depicting an example of the structure of a computer according to the example embodiment of the present invention. A computer 1000 includes a CPU 1001, a main storage device 1002, an auxiliary storage device 1003, and an interface 1004.

The information processing device 10 according to the example embodiment of the present invention is implemented by the computer 1000. The operation of the information processing device 10 is stored in the auxiliary storage device 1003 in the form of a program. The CPU 1001 reads the program from the auxiliary storage device 1003, expands the program in the main storage device 1002, and executes the aforementioned process according to the program.

The auxiliary storage device 1003 is an example of a non-transitory tangible medium. Examples of the non-transitory tangible medium include a magnetic disk, magneto-optical disk, compact disk read only memory (CD-ROM), digital versatile disk read only memory (DVD-ROM), and semiconductor memory connected via the interface 1004. In the case where the program is distributed to the computer 1000 through a communication line, the computer 1000 to which the program has been distributed may expand the program in the main storage device 1002 and execute the aforementioned process.

Figure 16:
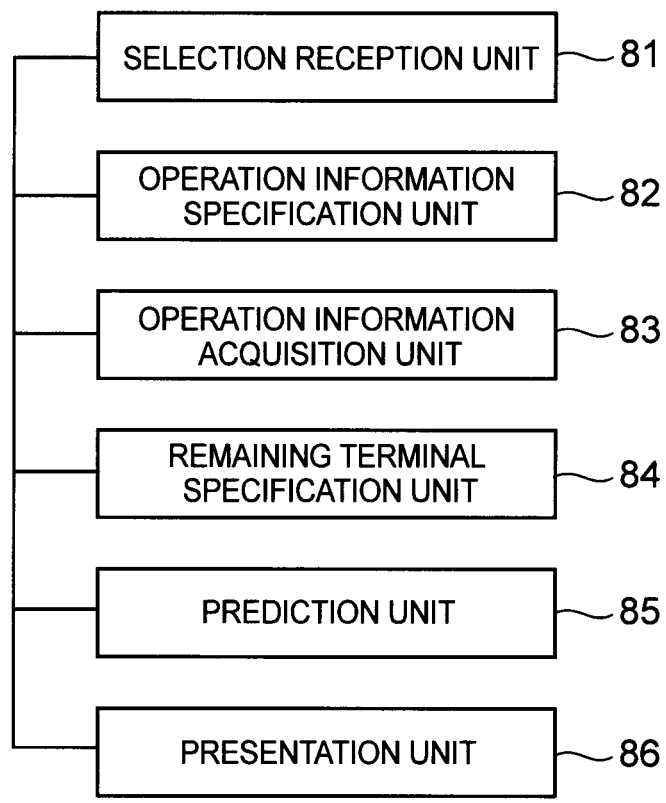
FIG. 16 It is a block diagram schematically depicting an information processing device according to the present invention.

An overview of the present invention is described below. FIG. 16 is a block diagram schematically depicting an information processing device according to the present invention. The information processing device according to the present invention includes a selection reception unit 81, an operation information specification unit 82, an operation information acquisition unit 83, a remaining terminal specification unit 84, a prediction unit 85, and a presentation unit 86.

The selection reception unit 81 (e.g. the selection reception unit 110) receives an input indicating selection of at least one countermeasure from a plurality of countermeasures applicable to terminals having a security risk.

The operation information specification unit 82 (e.g. the operation information specification unit 120), with use of terminal-specific countermeasure information indicating an applicable countermeasure for each terminal against the security risk and definition information defining a correspondence relationship between a type of operation information of the terminal and a countermeasure against the security risk, specifies a type of operation information corresponding to the countermeasure applicable to the terminal.

The operation information acquisition unit 83 (e.g. the information acquisition unit 170) acquires operation information of the type specified by the operation information specification unit 82, from among operation information of the terminal.

The remaining terminal specification unit 84 (e.g. the remaining terminal specification unit 140) specifies each remaining terminal that is a terminal in which the security risk remains in the case where the countermeasure received by the selection reception unit 81 is applied, based on the terminal-specific countermeasure information.

The prediction unit 85 (e.g. the prediction unit 150), based on the operation information acquired by the operation information acquisition unit 83, predicts the number of remaining terminals at a future time, and predicts the number of remaining terminals at the future time in expectation of the number of countermeasure suspension days that is the number of delay days from a scheduled date of countermeasure application in the past to an actual date of countermeasure application in the past.

The presentation unit 86 (e.g. the presentation unit 160) presents a result of the prediction by the prediction unit 85.

With such a structure, the number of terminals with a security risk remaining in the future can be predicted in expectation of a delay of a countermeasure.

The presentation unit 86 may present a screen showing a list of terminals whose number of countermeasure suspension days is 1 or more days.

The presentation unit 86 may present a screen showing a list of terminals whose number of countermeasure suspension days is 1 or more days, the screen including: a graphical user interface for designating a terminal; and a graphical user interface for notifying a user of the designated terminal to apply the countermeasure to the terminal.

The prediction unit 85 may predict the number of remaining terminals at the future time in expectation of the number of countermeasure suspension days, in time series, and the presentation unit 86 may present a graph representing, in time series, the number of remaining terminals at the future time in expectation of the number of countermeasure suspension days.

The prediction unit 85 may predict the number of remaining terminals in time series, up to a future time at which the number of remaining terminals is less than or equal to a predetermined number.

The information processing device may include a classification information storage unit (e.g. the classification information storage unit 194) for storing classification information for classifying each terminal, wherein the prediction unit 85 predicts, for each classification of the terminal, the number of remaining terminals at the future time, and the number of remaining terminals at the future time in expectation of the number of countermeasure suspension days.

The present invention is suitable for predicting the number of management object terminals in which a security risk remains.

The prediction of countermeasure application timing in the future and the prediction of the number of terminals in which a security risk remains may be performed.

However, the actual countermeasure application could be delayed for some reason. This incurs the possibility that, even in the case where the countermeasure application timing in the future is predicted, the timing of actually applying the countermeasure is behind the predicted timing. It is preferable if the number of terminals with a security risk remaining in the future can be predicted in expectation of such a countermeasure delay.

According to the present invention, the number of terminals with a security risk remaining in the future can be predicted in expectation of a delay of a countermeasure.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

What is claimed is:

1. An information processing device comprising:
   a selection reception unit for receiving an input indicating selection of at least one countermeasure from a plurality of countermeasures applicable to terminals having a security risk;
   an operation information specification unit for, with use of terminal-specific countermeasure information indicating an applicable countermeasure for each terminal against the security risk and definition information defining a correspondence relationship between a type of operation information of the terminal and a countermeasure against the security risk, specifying a type of operation information corresponding to the countermeasure applicable to the terminal;
   an operation information acquisition unit for acquiring operation information of the type specified by the operation information specification unit, from among operation information of the terminal;
   a remaining terminal specification unit for specifying each remaining terminal that is a terminal in which the security risk remains in the case where the countermeasure received by the selection reception unit is applied, based on the terminal-specific countermeasure information;
   a prediction unit for, based on the operation information acquired by the operation information acquisition unit, predicting the number of remaining terminals at a future time, and predicting the number of remaining terminals at the future time in expectation of the number of countermeasure suspension days that is the number of delay days from a scheduled date of countermeasure application in the past to an actual date of countermeasure application in the past; and a presentation unit for presenting a result of the prediction by the prediction unit.

2. The information processing device according to claim 1, wherein the presentation unit presents a screen showing a list of terminals whose number of countermeasure suspension days is 1 or more days.

3. The information processing device according to claim 1, wherein the presentation unit presents a screen showing a list of terminals whose number of countermeasure suspension days is 1 or more days, the screen including: a graphical user interface for designating a terminal; and a graphical user interface for notifying a user of the designated terminal to apply the countermeasure to the terminal.

4. The information processing device according to claim 1, wherein the prediction unit predicts the number of remaining terminals at the future time in expectation of the number of countermeasure suspension days, in time series, and wherein the presentation unit presents a graph representing, in time series, the number of remaining terminals at the future time in expectation of the number of countermeasure suspension days.

5. The information processing device according to claim 4, wherein the prediction unit predicts the number of remaining terminals in time series, up to a future time at which the number of remaining terminals is less than or equal to a predetermined number.

6. The information processing device according to claim 1, comprising a classification information storage unit for storing classification information for classifying each terminal, wherein the prediction unit predicts, for each classification of the terminal, the number of remaining terminals at the future time, and the number of remaining terminals at the future time in expectation of the number of countermeasure suspension days.

7. An information processing method comprising:

receiving an input indicating selection of at least one countermeasure from a plurality of countermeasures applicable to terminals having a security risk;

with use of terminal-specific countermeasure information indicating an applicable countermeasure for each terminal against the security risk and definition information defining a correspondence relationship between a type of operation information of the terminal and a countermeasure against the security risk, specifying a type of operation information corresponding to the countermeasure applicable to the terminal;

acquiring operation information of the specified type, from among operation information of the terminal;

specifying each remaining terminal that is a terminal in which the security risk remains in the case where the selected countermeasure is applied, based on the terminal-specific countermeasure information;

based on the acquired operation information, predicting the number of remaining terminals at a future time, and predicting the number of remaining terminals at the future time in expectation of the number of countermeasure suspension days that is the number of delay days from a scheduled date of countermeasure application in the past to an actual date of countermeasure application in the past; and presenting a result of the prediction.

8. A non-transitory computer-readable medium recording therein a program for causing a computer to execute:

a selection reception process of receiving an input indicating selection of at least one countermeasure from a plurality of countermeasures applicable to terminals having a security risk;

an operation information specification process of, with use of terminal-specific countermeasure information indicating an applicable countermeasure for each terminal against the security risk and definition information defining a correspondence relationship between a type of operation information of the terminal and a countermeasure against the security risk, specifying a type of operation information corresponding to the countermeasure applicable to the terminal;

an operation information acquisition process of acquiring operation information of the type specified in the operation information specification process, from among operation information of the terminal;

a remaining terminal specification process of specifying each remaining terminal that is a terminal in which the security risk remains in the case where the countermeasure received in the selection reception process is applied, based on the terminal-specific countermeasure information;

a prediction process of, based on the operation information acquired in the operation information acquisition process, predicting the number of remaining terminals at a future time, and predicting the number of remaining terminals at the future time in expectation of the number of countermeasure suspension days that is the number of delay days from a scheduled date of countermeasure application in the past to an actual date of countermeasure application in the past; and a presentation process of presenting a result of the prediction in the prediction process.

* * * * *